Dec. 27, 1927.

C. M. ARMSTRONG

PLANT PROTECTOR

Filed June 13, 1925

INVENTOR.
C. M. Armstrong.
BY
ATTORNEYS.

Dec. 27, 1927.  C. M. ARMSTRONG  1,654,446
PLANT PROTECTOR
Filed June 13, 1925   2 Sheets-Sheet 2

INVENTOR.
Charles M. Armstrong
BY Clark C. Morrel
ATTORNEY.

Patented Dec. 27, 1927.

1,654,446

UNITED STATES PATENT OFFICE.

CHARLES M. ARMSTRONG, OF EAST LANSING, MICHIGAN.

PLANT PROTECTOR.

Application filed June 13, 1925. Serial No. 36,955.

My invention is intended to furnish a cheap method of protecting growing plants from freezing by covering them with a paper bag which is provided with a suitable means for retaining it in position.

In the drawings forming a part of this application and in which like reference characters designate corresponding parts throughout the several views, Figure 1 is a bottom plan view of the complete device in its open position;

Figure 2 is a side elevation thereof;

Figures 3 and 4 are transverse vertical sectional views taken respectively upon lines 3—3 and 4—4 of Figure 1;

Figure 1:
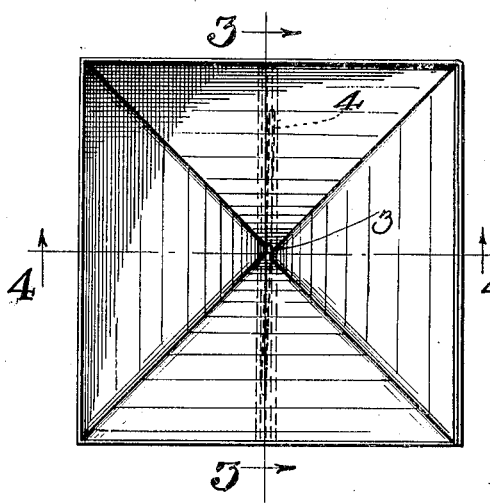
Figure 2:
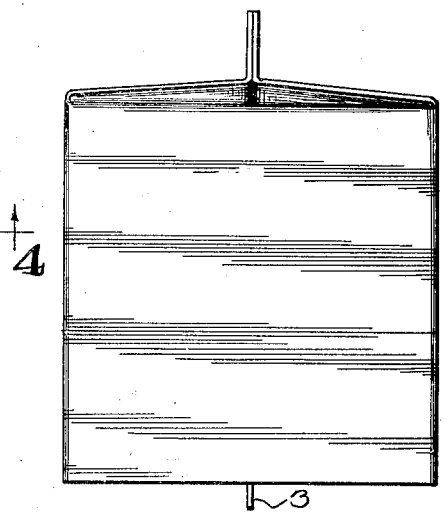
Figure 4:
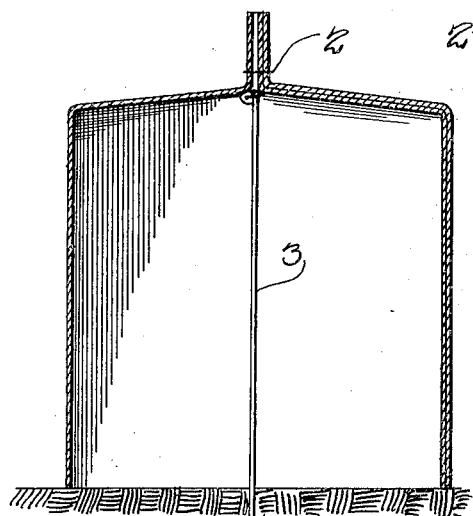
Figure 5:
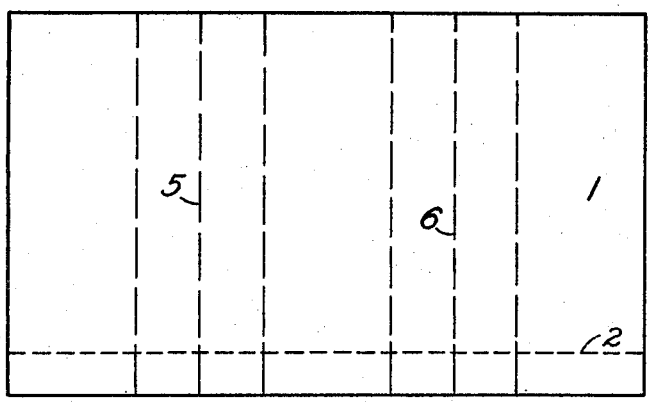
Figure 5 illustrates the sheet of paper of which the device is formed, the folding being indicated by dotted lines.
Figure 6:
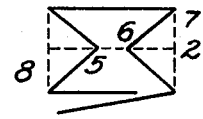
Figure 6 is a sectional view illustrating the manner of making the foldings.
Figure 7:
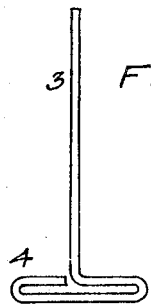
Figure 7 illustrates the form of the wire for holding the device in position.

My device is composed of a sheet of paper 1 which is folded in the manner shown in Figure 6 and is then stitched or otherwise fastened together across the bottom as shown at 2 in Figure 4. The dotted line in Figure 5 shows the direction in which the stitching is done. For retaining the device in position, a wire 3 of any desired length is bent preferably into the form of a T as shown in Figure 7.

Figure 3:
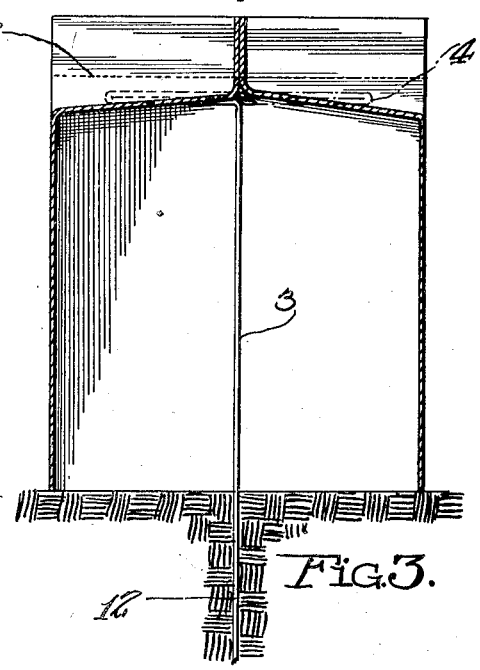

When it is desired to use my device the wire 3 is inserted with its head 4 close in to the row of stitching and parallel with it. The foldings 5 and 6 are then straightened out as indicated by the straight dotted lines 7 and 8 in Figure 6 and are then pressed closer together along the line 2 as illustrated. In order to do this it is necessary to double in the portion immediately above the stitching as shown in Figs. 3 and 4 above the head 4, thus retaining the wire in position; the device is then unfolded, inverted, and placed over the plant and the projecting wire 12 is pushed into the ground to retain the whole in position. Of course the device may be made of any desired size or of any suitable material without departing from my invention.

I claim as my invention and desire to secure by Letters Patent:

1. In combination, a sheet of flexible material folded into a flat bellows form and closed at one extremity while flattened so that when expanded it will form a bag, and a wire having one extremity bent so as to be retained in position by the folds of said bag when expanded.

2. In combination, a sheet of flexible material folded into a flat bellows form with adjacent edges of the side folds being contiguous when in flat form, stitched near one extremity while flattened so as to form a bag when expanded, and a wire having one extremity bent so as to be retained in position by the foldings of said bag when so expanded and completely covered by said foldings.

3. In combination, a sheet of flexible material folded into a flat bellows form and closed at one extremity while flattened so that when expanded it will form a bag, and a wire having one extremity bent so as to be releasably retained in position by the folds of said bag when expanded.

CHARLES M. ARMSTRONG.